Sept. 13, 1938.  W. J. HOGG  2,130,181
POSITIVE ACTING EXPANDING PIPE DIE
Filed Dec. 30, 1936   6 Sheets-Sheet 3
*Fig. 3.*
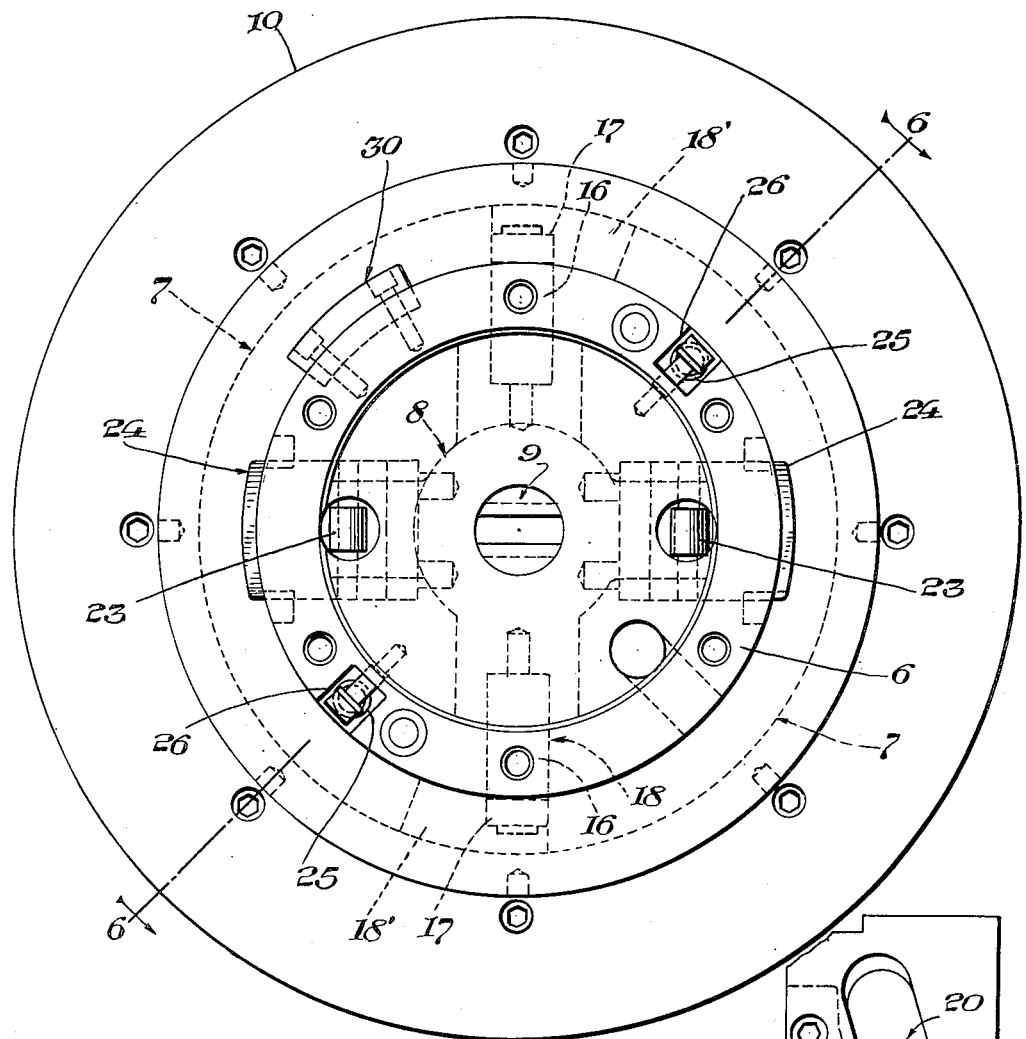
*Fig. 9.*
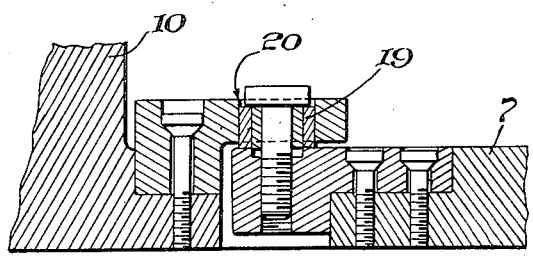
*Fig. 10.*
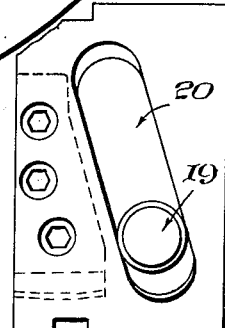
INVENTOR
William J. Hogg
BY
ATTORNEY

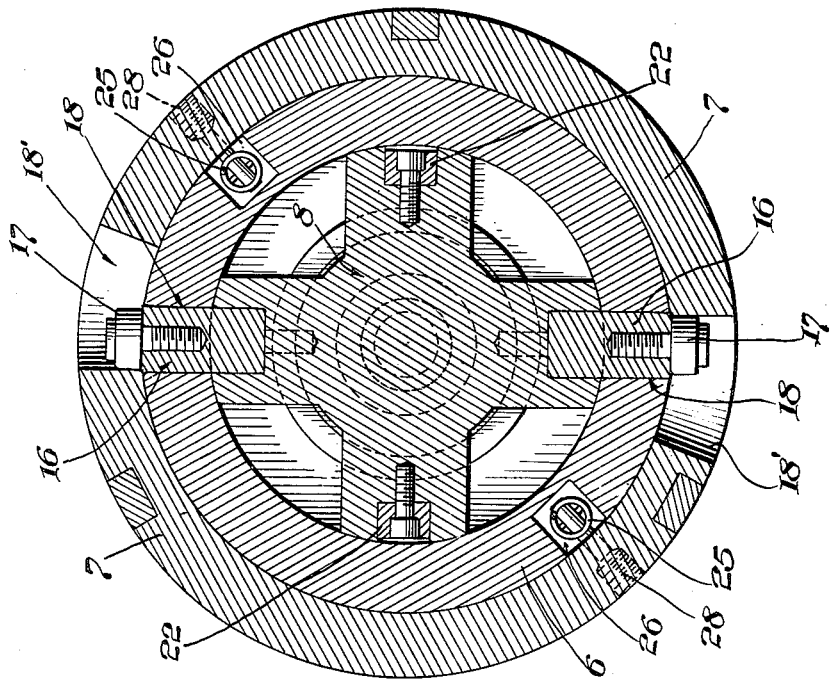
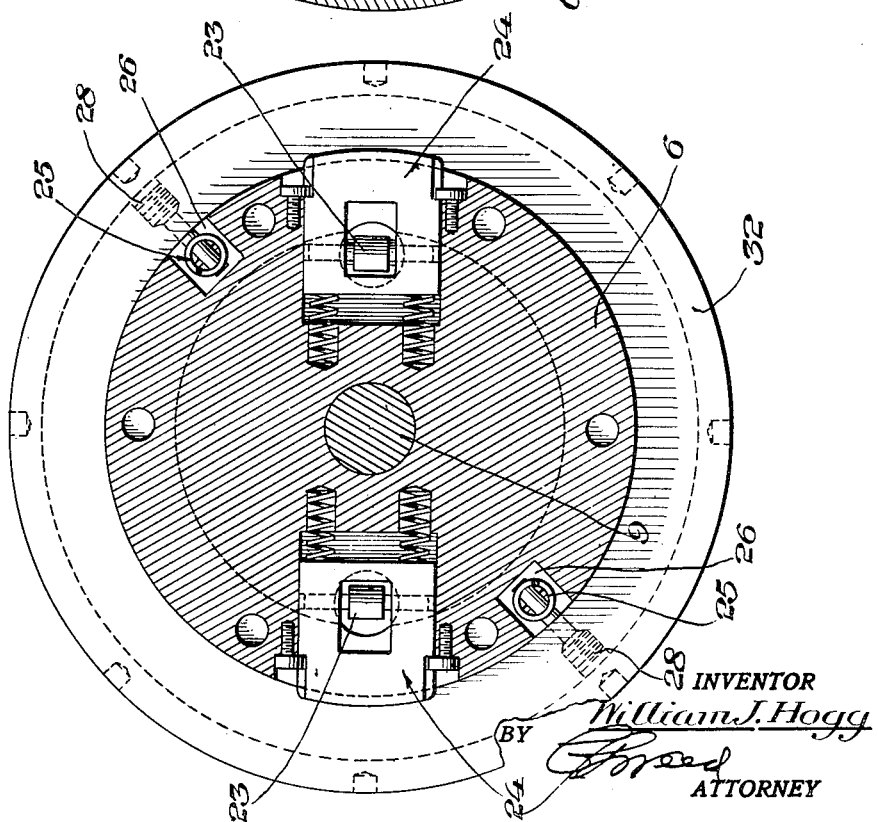

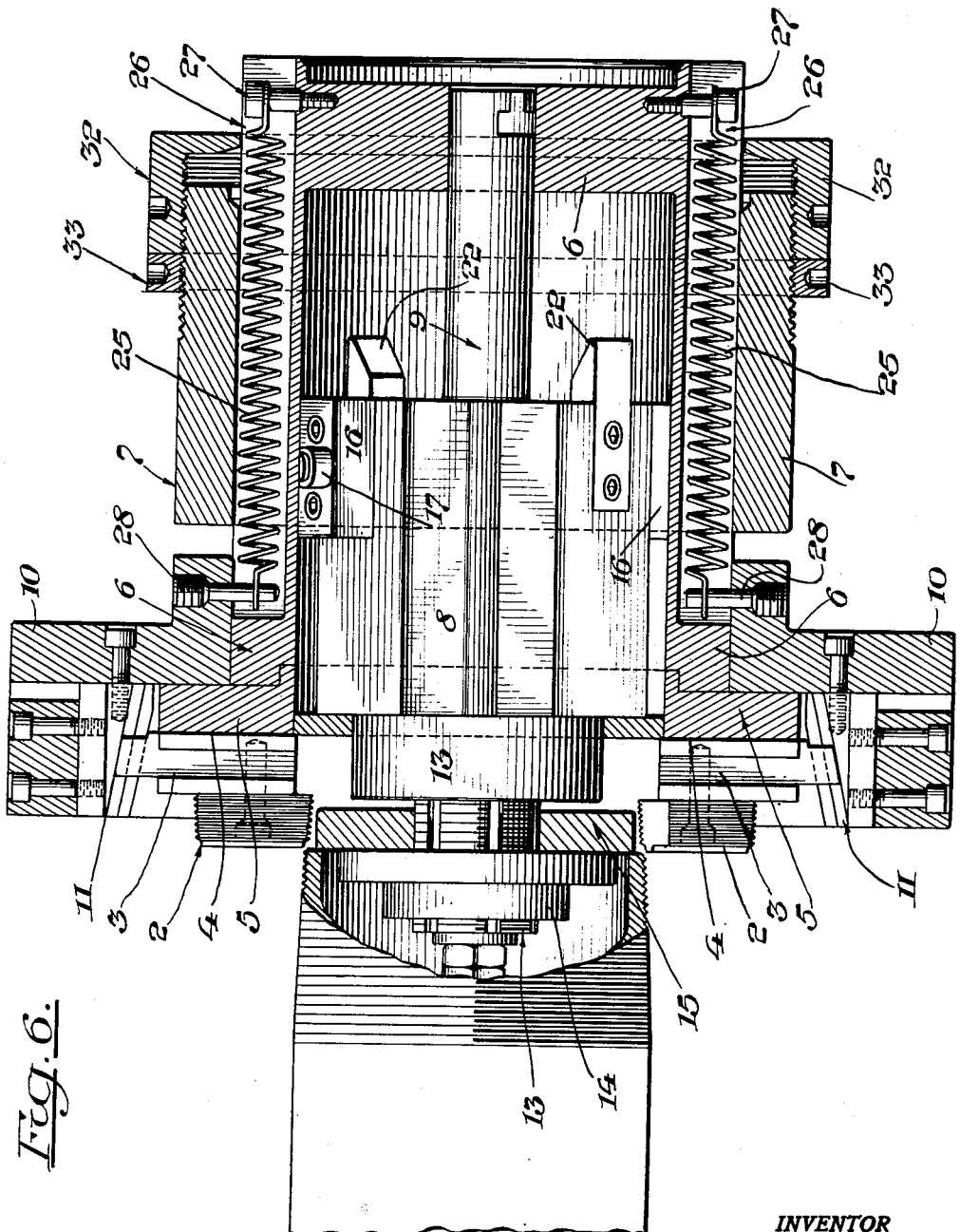

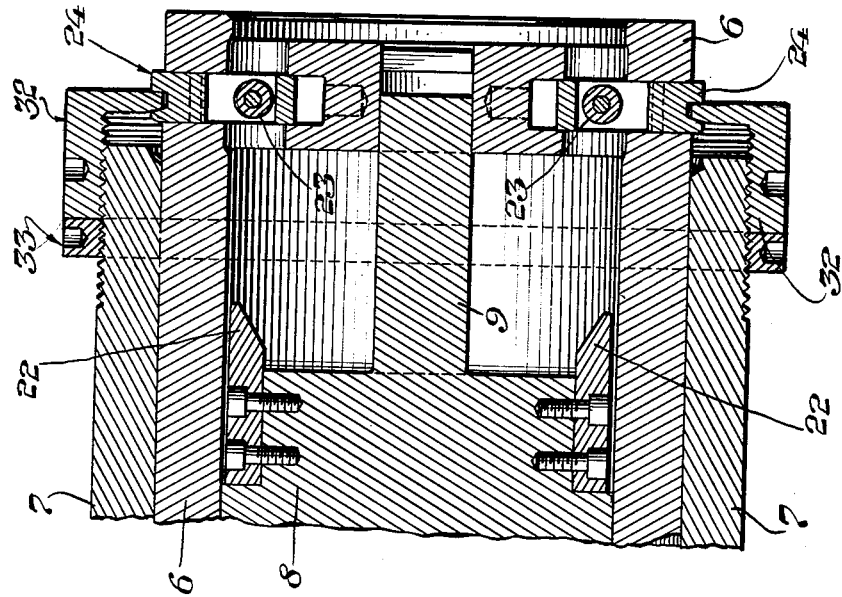
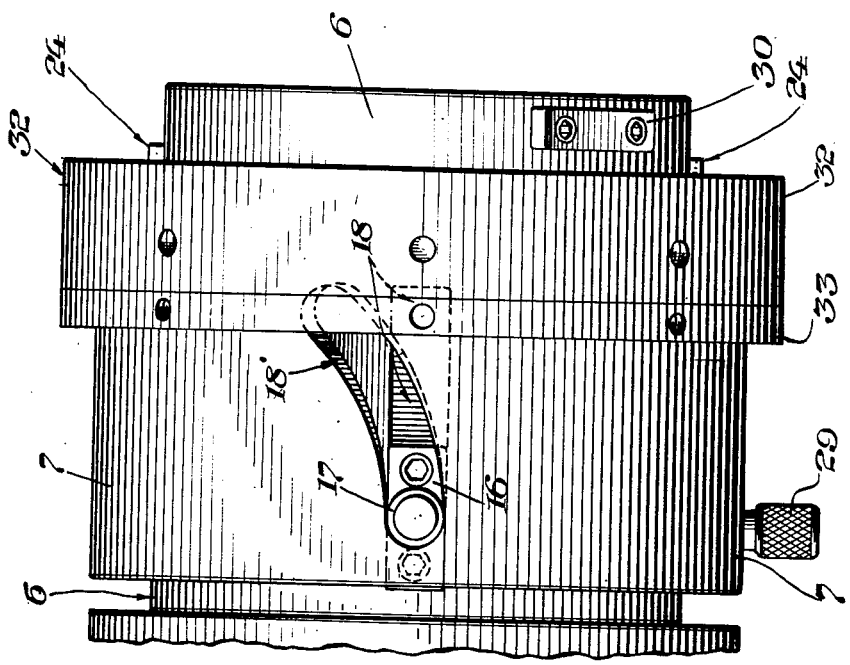

UNITED STATES PATENT OFFICE 2,130,181

POSITIVE ACTING EXPANDING PIPE DIE

William J. Hogg, Cleveland, Ohio, assignor to The National Acme Company, Cleveland, Ohio, a corporation of Ohio Application December 30, 1936, Serial No. 118,313

20 Claims. (Cl. 10—120.5)

This invention relates to threading dies, the object thereof being to provide an improved positively acting expanding pipe die, simple in construction, comparatively inexpensive to manufacture, efficient in use, and by means of which the cutters or chasers will be positively expanded efficiently and accurately to cut a tapered thread.

In the drawings accompanying and forming a part of this specification, Fig. 1 is a longitudinal section of this improved threading die, the figure also illustrating a pipe in position with a tapered thread cut thereon and also illustrating in dotted lines a smaller diameter of pipe.

Fig. 3 is a rear end view of the die shown in Fig. 1.

Fig. 4 is a cross sectional view taken on the line 4—4 of Fig. 1, looking in the direction of the arrows.

Fig. 5 is a cross sectional view taken on the line 5—5 of Fig. 1, looking in the direction of the arrows.

Fig. 6 is a longitudinal sectional view taken on the line 6—6 of Fig. 3, looking in the direction of the arrows.

Fig. 7 is a longitudinal section of the rear end of the die, showing the trip plungers and trip levers.

Fig. 8 is an exterior view thereof.

Fig. 9 is a transverse section on the line 9—9 of Fig. 1, illustrating the drawback cam and its roll, and Fig. 10 is a plan view of Fig. 9.

Similar characters of reference indicate corresponding parts in the several views.

Figure 1:
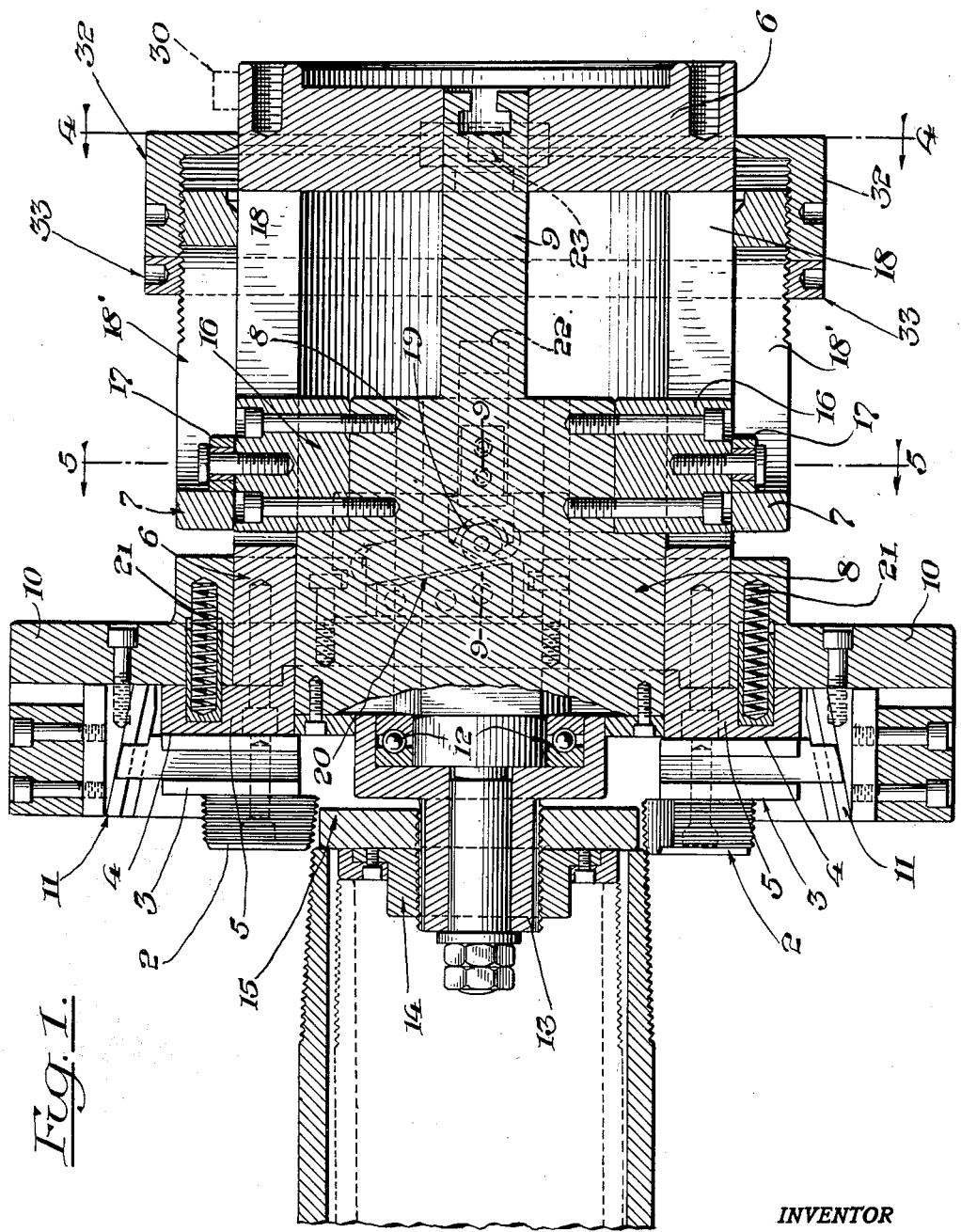
Figure 2:
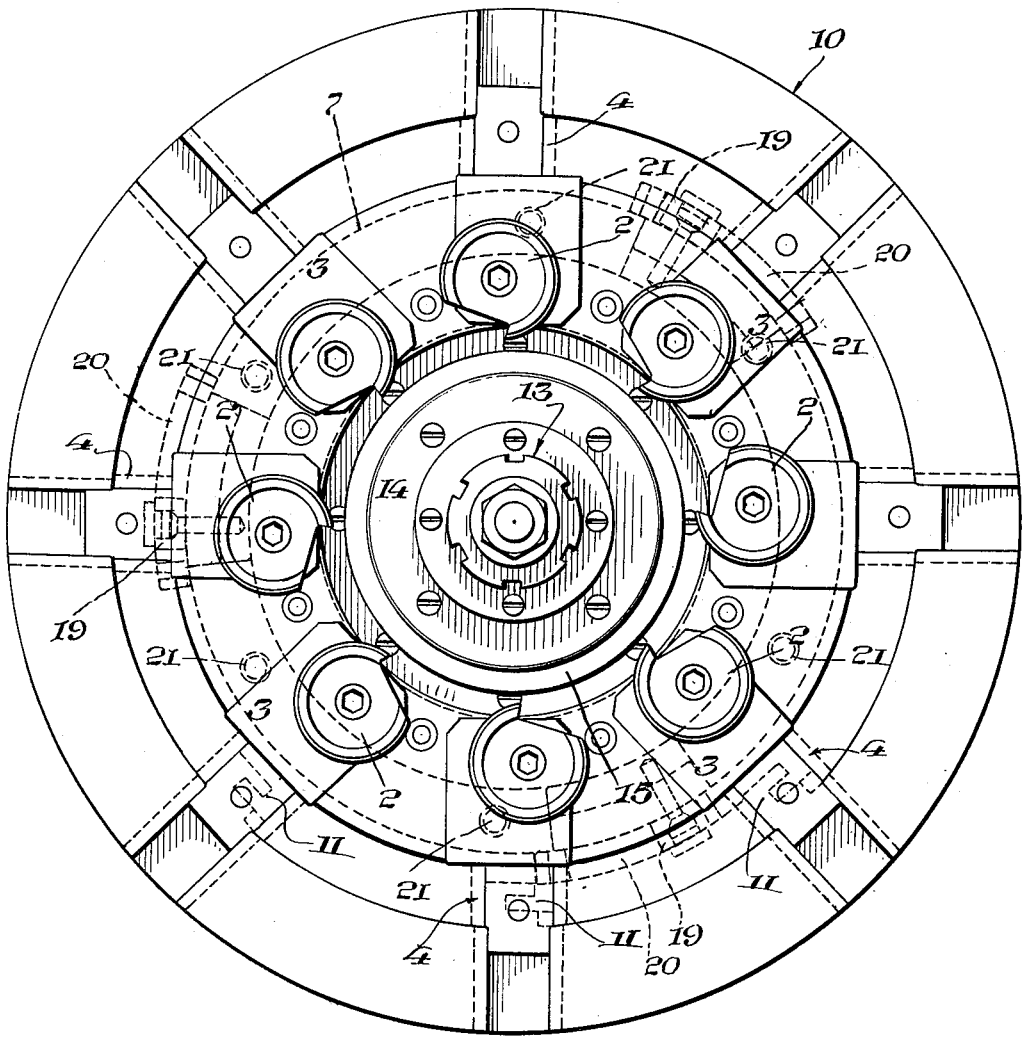
Fig. 2 is a front end view of the die shown in Fig. 1.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

The chasers or cutters used in this improved die are of circular form and are similar to those shown and described in my prior Patents Nos. 1,923,265, of August 22nd, 1933, and No. 1,952,205 of March 27th, 1934, and, therefore, a detailed description thereof is unnecessary.

These chasers 2 may be mounted in a manner similar to that shown and described in said patents, upon chaser blocks 3 radially supported in suitable guideways 4 of a head 5 secured to a housing or cap 6 fitting within a rotatable and longitudinally shiftable sleeve 7.

Within this housing 6 is a die body 8 having a rearwardly extending stem 9 axially guided at its rear end in a bore of the housing 6. The housing 6 and body 8 have relative sliding movements. When the work is fed, the body 8 will be shifted within the housing but when the die is fed as in the present instance, the housing is shifted on the body during the threading operation.

Mounted on the die housing 6 in front of the sleeve is a shiftable hood 10 to which are secured tapered gibs 11 interlocking with the projecting ends of the die blocks 3 and by means of which the die blocks and the chasers are gradually and positively expanded to cut a tapered thread and also shifted into position to start the threading.

Rotatably supported by suitable bearings 12 on a forward projection or nose of the die body 8 is a projecting collar carrying member 13 secured on the projection by nuts and threaded for the reception of detachable collars 14 and 15. These collars have diameters corresponding to different external diameters or sizes of pipes and various diameters of collars may be used within the capacity of the die for different sizes of pipes. As shown in full lines in Fig. 1, when the die is brought up to the pipe to be threaded, the end of the pipe will contact with the collar 15, or if it is a smaller size of pipe, it will contact with the collar 14 and hold the die body 8 back in the bore of the housing 6 of the die as the latter moves forward to have its chasers cut the threads in the pipe. The bearings 12 serve to reduce to a minimum friction between the work and the collars.

Attached to the die body by keys 16 is a pair of oppositely located rollers 17. These keys slide in a pair of elongated slots or key-ways 18 in the housing 6 and these slots 18 prevent rotation of the keys 16 and body 8 relative to the housing but permit shiftable movement back and forth of the die body 8 and housing 6 relative to each other.

The rollers 17 project into a pair of spiral slots 18' (see Fig. 8) machined in the sleeve 7 mounted on the housing 6 and, therefore, as the housing 6 moves forward, the rollers 17, while the body 8 is held back by the work, cause the sleeve 7 to turn or rotate. As the sleeve turns, a series of spaced rollers 19, preferably three, secured to the sleeve, move circumferentially therewith and draw the cams 20 attached to the hood likewise backward, this backward movement being also assisted by a series of springs 21 and also springs 25 hereinafter referred to in that they take up any wear of the cams and rollers. In other words, the forward travel of the die causes the pipe in engagement with one of the collars 14 or 15 to hold back the body 8 and thereby, through the rollers 17, rotates the sleeve 7 so that the rollers 19 of this sleeve 7 will ride between the inclined opposed faces of the cams 20 of the hood and thus draw the hood gradually to the rear on the housing 6. The springs 21 constantly hold the forward cam faces in engagement with the rollers 19.

In Figs. 9 and 10, the formation of one of these cam members is shown, whereby they will act to draw the hood 10 backward in a positive manner.

When this hood 10 is thus gradually drawn back, the tapered gibs 11 pull the chaser blocks 3 gradually outwardly, causing the chasers to expand slowly, thereby cutting a tapered thread on the pipe controlled by the taper on the gibs 11 and which are gradually shifted in correspondence with the taper on the cams 20.

The position of the collars 14 or 15 determines the length of the thread. By adjusting the collar forward so that it contacts the work prior to the engagement thereof by the chasers, a short thread will be obtained and a reverse adjustment will give a longer thread since the position of the collars determines the relative sliding movement of the housing 6 and body 8.

The adjustable collar 32 locked in position by the collar 33 determines the adjustment for size since, by adjusting this collar on the sleeve 7, this sleeve 7, roller 19, cam 20, hood 10 and gibs 11 are shifted forward or backward causing the adjustment of the chasers outward or inward for larger or smaller diameters of work.

When the die has moved forwardly sufficiently to cut the thread, the trip plungers 22 carried by the body (see Figs. 6 and 7) and having tapered ends come into contact with rollers 23 carried by trip levers 24 mounted in the rear end of the housing 6 of the die and which project into position to lock the sleeve 7 by engaging a collar 32 thereof. These trip levers have their ends formed to engage both sides of the collar 32.

When the tapered ends of these plungers thus engage the rollers 23, they force the spring pressed trip levers to recede into the housing 6 of the die, thereby allowing the control sleeve 7, together with the hood 10, to jump back under the pull of the springs 21 and 25.

The springs 21 are located in openings of the hood 10 and die head 5 carrying the chaser blocks 3 while the springs 25 are located in recesses 26 of the housing 6 and connected at their ends 27 and 28 to this housing and to the hood.

When the hood 10 thus jumps backward, the gibs 11, interlocked with the chaser blocks 3, pull the blocks and their chasers out of the threads.

The die may be reset in any suitable manner as by means of a handle 29 (see Fig. 8) for moving the sleeve 7 and thereby the hood 10 until the parts are in their normal operating position, at which time the trip levers will again lock the sleeve 7 in position.

The housing 6 of the die is provided with a suitable stop or stops 30 (see Fig. 8), to limit rearward movement of the sleeve when the trip levers release the sleeve.

It is to be understood that, by describing in detail herein any particular structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A threading die of the class described comprising a housing and a body shiftable one relative to the other, rotatable means carried by the housing at one end thereof, means carried by the body for rotating said rotatable means as the housing and body are relatively shifted by the work, a plurality of chasers, shiftable means carried by the housing at the other end thereof for gradually shifting the chasers to cut a tapered thread, and interlocking cam means carried at the rear of said shiftable and at the front of said rotatable means whereby, on the rotation of the latter, said shifting means will be gradually drawn back relative to the housing.

2. A threading die of the class described comprising a housing and a body shiftable one relative to the other, rotatable means carried by the housing at one end thereof, means carried by the body for rotating said rotatable means as the housing and body are relatively shifted by the work, a plurality of circular chasers, shiftable means carried by the housing at the other end thereof for gradually shifting the chasers to cut a tapered thread, positively acting means carried at the rear of said shiftable and at the front of said rotatable means whereby, on the rotation of the latter, said chaser shifting means will be gradually drawn back relative to the housing, and means for maintaining contact between said chaser shifting means and said rotatable means.

3. A threading die of the class described comprising a housing and a body shiftable one relative to the other, rotatable means carried by the housing at one end thereof, means carried by the body for rotating said rotatable means as the housing and body are relatively shifted by the work, a plurality of chasers, shiftable means carried by the housing at the other end thereof for gradually shifting the chasers to cut a tapered thread, cooperating interlocking cam means carried at the rear of said shiftable and at the front of said rotatable means whereby, on the rotation of the latter, said chaser shifting means will be gradually drawn back relative to the housing, and means for maintaining contact between said chaser shifting means and said rotatable means.

4. A threading die of the class described comprising a housing and a body shiftable one relative to the other, rotatable means carried by the housing, means carried by the body for rotating said rotatable means as the housing and body are relatively shifted by the work, a plurality of chasers, shiftable means carried by the housing for gradually shifting the chasers to cut a tapered thread, means carried by said shiftable and rotatable means whereby, on the rotation of the latter, said chaser shifting means will be gradually drawn back relative to the housing, means for maintaining contact between said chaser shifting means and said rotatable means, and means for tripping the rotatable means on the completion of the threading, said means comprising a trip lever slidably carried by the housing and means carried by the body for directly engaging said trip lever upon the completion of the threading operation.

5. A threading die of the class described comprising a housing and a body shiftable, one relative to the other, rotatable means carried by the housing, means carried by the body for rotating said rotatable means as the housing and body are relatively shifted by the work, a plurality of chasers, shiftable means carried by the housing for gradually shifting the chasers to cut a tapered thread, positively acting co-operating cam means carried by said shiftable and rotatable means whereby, on the rotation of the latter, said chaser shifting means will be gradually drawn back relative to the housing, means for maintaining contact between said chaser shifting means and said rotatable means, and means for tripping the rotatable means on the completion of the threading, said means comprising a trip lever slidably carried by the housing and means carried by the body for directly engaging said trip lever upon the completion of the threading operation.

6. A threading die of the class described comprising a housing and a body slidable one relative to the other, said body having means adapted to contact with the work thereby to hold the body back within the housing, a rotatable sleeve on said housing, means carried by the body and co-operating with the sleeve for rotating it, a hood directly mounted on the housing in front of and spaced from said rotatable sleeve, interlocking means carried at the rear of the hood and at the front of said sleeve whereby on the rotation of the sleeve the hood will be gradually drawn back, a plurality of chasers, and means controlled by the hood for gradually expanding the chasers thereby to cut a tapered thread.

7. A threading die of the class described comprising a housing and a body relatively slidable, said body having means adapted to contact with the work thereby to hold the body back within the housing, a rotatable sleeve on said housing, means carried by the body and cooperating with the sleeve for rotating it, a hood directly mounted on the housing in front of and spaced from said rotatable sleeve, co-operating interlocking cam means carried at the rear of the hood and at the front of the sleeve whereby on the rotation of the sleeve the hood will be gradually drawn back, a plurality of chasers, and means controlled by the hood for gradually expanding the chasers thereby to cut a tapered thread.

8. A threading die of the class described comprising a housing and a body relatively slidable, said body having means adapted to contact with the work thereby to hold the body back within the housing, a rotatable sleeve on said housing, means carried by the body and cooperating with the sleeve for rotating it, a hood directly mounted on the housing in front of and spaced from said rotatable sleeve, cooperating interlocking cam means carried at the rear of the hood and at the front of the sleeve whereby on the rotation of the sleeve the hood will be gradually drawn back, resilient means for maintaining contact between the cam means of the hood and the sleeve, a plurality of chasers, and means controlled by the hood for gradually expanding the chasers thereby to cut a tapered thread.

9. A threading die of the class described comprising a housing and a body relatively slidable said body having means adapted to contact with the work thereby to hold the body back within the housing, a rotatable sleeve on said housing, means carried by the body and cooperating with the sleeve for rotating it, a hood directly mounted on the housing in front of and spaced from said rotatable sleeve, positively acting cooperating cam means carried at the rear of the hood and at the front of the sleeve whereby on the rotation of the sleeve the hood will be gradually drawn back, resilient means for maintaining contact between the cam means of the hood and the sleeve, a plurality of circular chasers, and means controlled by the hood for gradually expanding the chasers thereby to cut a tapered thread.

10. A threading die of the class described comprising a housing and a body relatively slidable, said body having means adapted to contact with the work thereby to hold the body back within the housing, a rotatable sleeve on said housing, means carried by the body and co-operating with the sleeve for rotating it, a hood mounted on the housing, means carried by the hood and sleeve whereby on the rotation of the sleeve the hood will be gradually drawn back, a plurality of chasers, means controlled by the hood for gradually expanding the chasers thereby to cut a tapered thread, and means for tripping the rotatable sleeve on the completion of the threading thereby to release the cutters from the work, said means comprising a trip lever slidably carried by the housing and means carried by the body for directly engaging said trip lever upon the completion of the threading operation.

11. A threading die of the class described comprising a housing and a body relatively slidable, said body having interchangeable friction reducing means adapted to contact with the work, thereby to hold the body back within the housing, a rotatable sleeve on said housing, means carried by the body and co-operating with the sleeve for rotating it, a hood directly mounted on the housing in front of and spaced from said rotatable sleeve, positively acting cooperating cam means carried at the rear of the hood and at the front of the sleeve whereby on the rotation of the sleeve the hood will be gradually drawn back, a plurality of chasers, and means controlled by the hood for gradually expanding the chasers thereby to cut a tapered thread.

12. A threading die of the class described comprising a housing and a body shiftable one relative to the other, rotatable means carried by the housing, means carried by the body for rotating said rotatable means as the housing and body are relatively shifted by the work, a plurality of chasers, shiftable means carried by the housing in front of and spaced from said rotatable means for gradually shifting the chasers to cut a tapered thread, interlocking cam means carried at the rear of said shiftable and at the front of said rotatable means whereby on the rotation of the latter, said chaser shifting means will be gradually drawn back relative to the housing, and means for adjusting the rotatable means.

13. A threading die of the class described comprising a housing and a body one shiftable relative to the other, rotatable means carried by the housing, means carried by the body for rotating said rotatable means as the housing and body are relatively shifted by the work, a plurality of chasers, shiftable means carried by the housing for gradually shifting the chasers to cut a tapered thread, means carried by said shiftable and rotatable means whereby, on the rotation of the latter, said chaser shifting means will be gradually drawn back relative to the housing, means for maintaining contact between said chaser shifting means and said rotatable means, means for tripping the rotatable means on the completion of the threading, said means comprising a trip lever slidably carried by the housing and means carried by the body for directly engaging said trip lever upon the completion of the threading operation, and means for adjusting the rotatable means.

14. A threading die of the class described comprising a housing and a body, one slidable relative to the other, said body having rotatable friction reducing means adapted to contact with the work thereby to hold the body back within the housing, a rotatable sleeve on said housing, means carried by the body and cooperating with the sleeve for rotating it, a hood directly mounted on the housing in front of said sleeve, positively acting cooperating cam means carried at the rear of the hood and at the front of said sleeve whereby on the rotation of the sleeve the hood will be gradually drawn back, a plurality of chasers, means controlled by the hood for gradually expanding the chasers thereby to cut a tapered thread, and means for adjusting the rotatable sleeve.

15. A pipe die for cutting tapered threads comprising a housing having elongated slots, a body movable relative to the housing and having projecting means shiftable in said slots and carrying rollers, a sleeve on the housing and having spiral slots into which said rollers project and by means of which the sleeve is rotated on the relative shifting of the body and housing, a hood directly mounted on the housing in front of said sleeve and carrying tapered gibs, a plurality of chaser carrying blocks slidingly mouned in front of the hood and interlocked with the gibs whereby on the movement of the hood the chasers will be gradually expanded to cut tapered threads, cams carried at the rear of the hood, means cooperating therewith and carried at the front of the rotatable sleeve whereby on the rotation of the sleeve the hood will be positively drawn rearwardly to shift the gibs, thereby to expand the cutters, and means for holding the cams of the hood in engagement with the means of the sleeve.

16. A pipe die for cutting tapered threads comprising a housing having elongated slots, a body movable relatively to the housing and having projecting means shiftable in said slots and carrying rollers, a sleeve on the housing and having spiral slots in which said rollers project and by means of which the sleeve is rotated on the relative shifting of the body and housing, a hood mounted on the housing and carrying tapered gibs, a plurality of chaser carrying blocks slidingly mounted in front of the hood and interlocked with the gibs whereby on the movement of the hood the chasers will be gradually expanded to cut tapered threads, cams carried by the hood, means co-operating therewith and carried by the rotatable sleeve whereby on the rotation of the sleeve the hood will be drawn rearwardly to shift the gibs, thereby to expand the cutters, means for holding the cams of the hood in engagement with the means of the sleeve and tripping means for releasing the sleeve when the thread has been cut thereby to permit the same to jump rearwardly together with the hood and release the cutters from the threads, said means comprising a trip lever slidably carried by the housing and means carried by the body for directly engaging said trip lever upon the completion of the threading operation.

17. A pipe die for cutting tapered threads comprising a housing having elongated slots, a body movable relatively to the housing and having projecting means shiftable in said slots and carrying rollers, a sleeve on the housing and having spiral slots into which said rollers project and by means of which the sleeve is rotated on the relative shifting of the body and housing, a hood mounted on the housing and carrying tapered gibs, a plurality of chaser carrying blocks slidingly mounted in front of the hood and interlocked with the gibs whereby on the movement of the hood the chasers will be gradually expanded to cut tapered threads, cams carried by the hood, means cooperating therewith and carried by the rotatable sleeve whereby on the rotation of the sleeve the hood will be positively drawn rearwardly to shift the gibs, thereby to expand the cutters, means for holding the cams of the hood in engagement with the means of the sleeve, tripping means for releasing the sleeve when the thread has been cut thereby to permit the same to jump rearwardly together with the hood and release the cutters from the threads, said means comprising a trip lever slidably carried by the housing and means carried by the body for directly engaging said trip lever upon the completion of the threading operation, and means for adjusting the rotatable sleeve.

18. A pipe die for cutting tapered threads comprising a housing having elongated slots, a body movable relatively to the housing and having projecting means shiftable in said slots and carrying rollers, a sleeve on the housing and having spiral slots into which said rollers project and by means of which the sleeve is rotated on the relative shifting of the body and housing, a hood mounted on the housing and carrying tapered gibs, a plurality of chaser carrying blocks slidingly mounted in front of the hood and interlocked with the gibs whereby on the movement of the hood the chasers will be gradually expanded to cut tapered threads, positively acting cams carried by the hood, means cooperating therewith and carried by the rotatable sleeve whereby on the rotation of the sleeve the hood will be positively drawn rearwardly to shift the gibs thereby to expand the cutters, tripping means for releasing the sleeve when the thread has been cut thereby to permit the same to jump rearwardly together with the hood and release the cutters from the threads, said means comprising a trip lever slidably carried by the housing and means carried by the body for directly engaging said trip lever upon the completion of the threading operation, and resilient means for holding the cams of the hood in engagement with the means of the sleeve and for effecting the retraction of the sleeve.

19. A threading die of the class described comprising a housing and a body therein and shiftable one relative to the other, rotatable means mounted on the housing, means carried by the body for rotating said rotatable means as the housing and body are relatively shifted, a plurality of chasers carried by the housing, shiftable means directly mounted on the housing in front of said rotatable means for actuating the chasers, and interlocking cam means carried at the rear and front, respectively, of the shiftable and rotatable means for positively gradually drawing back the shiftable means on the rotation of the rotatable means.

20. A threading die of the class described comprising a housing and a body therein and shiftable one relative to the other, rotatable means mounted on the housing, means carried by the body for rotating said rotatable means as the housing and body are relatively shifted, a plurality of chasers carried by the housing, shiftable means directly mounted on the housing in front of said rotatable means for actuating the chasers, interlocking cam means carried at the rear and front, respectively, of the shiftable and rotatable means for positively gradually drawing back the shiftable means on the rotation of the rotatable means, and tripping means for tripping the rotatable means on the completion of the threading operation and carried by the body and housing.

WILLIAM J. HOGG.